US012700083B2

(12) United States Patent
Remacha et al.

(10) Patent No.: US 12,700,083 B2
(45) Date of Patent: Aug. 4, 2026

(54) METHOD FOR DETERMINING THE PRESENCE OF ONE DEFECT ON A TOMOGRAPHIC IMAGE OF A THREE-DIMENSIONAL PART BY BREAKING THE IMAGE DOWN INTO PRINCIPAL COMPONENTS

(71) Applicants:Safran, Paris (FR); Association pour la Recherche et le Développement des Méthodes et Processus Industriels (A.R.M.I.N.E.S.), Paris Cedex (FR)

(72) Inventors: Clément Remacha, Moissy-Cramayel (FR); Guillaume Redoules, Moissy-Cramayel (FR); Axel Aublet, Moissy-Cramayel (FR)

(73) Assignees: Safran, Paris (FR); Association pour la Recherche et le Développement des Méthodes et Processus Industriels (A.R.M.I.N.E.S.), Paris Cedex (FR)

( * ) Notice: Subject to any disclaimer, the term of this patent is extended or adjusted under 35 U.S.C. 154(b) by 278 days.

(21) Appl. No.: 18/570,575

(22) PCT Filed: Jun. 13, 2022

(86) PCT No.: PCT/FR2022/051127
§ 371 (c)(1),
(2) Date: Dec. 14, 2023

(87) PCT Pub. No.: WO2022/263760
PCT Pub. Date: Dec. 22, 2022

(65) Prior Publication Data
US 2024/0289943 A1     Aug. 29, 2024

(30) Foreign Application Priority Data
Jun. 18, 2021    (FR) ...................................... 2106516

(51) Int. Cl.
*G06T 7/00*        (2017.01)
*G06T 7/10*        (2017.01)

(52) U.S. Cl.
CPC ............... *G06T 7/001* (2013.01); *G06T 7/10* (2017.01); *G06T 2207/10072* (2013.01)

(58) Field of Classification Search
CPC ... G06T 7/0002–001; G06T 7/30; G06T 7/10; G06T 2207/30108; G06T 2207/10072; G01N 23/046; G01N 2223/401; G01N 2223/419; G01N 2223/63; G01N 2223/6466
See application file for complete search history.

(56) References Cited

U.S. PATENT DOCUMENTS

| | | | | |
|---|---|---|---|---|
| 6,041,132 A | * | 3/2000 | Isaacs | ................... G06T 11/008 600/407 |
| 2014/0010342 A1 | * | 1/2014 | Basu | .................... G01N 23/083 382/103 |
| 2018/0195978 A1 | | 7/2018 | Schneider et al. | |
| 2023/0342998 A1 | * | 10/2023 | Borkowski | ............... G06T 7/11 |

FOREIGN PATENT DOCUMENTS

CN        110044935 A      7/2019

OTHER PUBLICATIONS

International Patent Application No. PCT/FR2022/051127, International Search Report, Translation of International Search Report, and Written Opinion, dated Oct. 6, 2022.

(Continued)

*Primary Examiner* — Sean T Motsinger
(74) *Attorney, Agent, or Firm* — Kilpatrick Townsend & Stockton LLP

(57)        ABSTRACT

A method for determining the presence of at least one defect in a three-dimensional part on the basis of a reference base, wherein:
  an image of the part is acquired by tomography;
  the image is segmented and the segmented image is registered with respect to the images of the reference base;

(Continued)

the subdomains associated with the registered segmented image are determined; and for each subdomain of the registered segmented image, the following steps are carried out:

registering the subdomain;

breaking down the subdomain with respect to the principal modes of the reference base;

generating a synthetic image of the subdomain from the breakdown, which is subtracted from the registered segmented image of the subdomain; and determining that a defect is present on the basis of the comparison of the value of each pixel of the residual image with a predetermined threshold.

5 Claims, 2 Drawing Sheets

(56) References Cited

OTHER PUBLICATIONS

Danni et al., "Adaptive Tensor-Based Principal Component Analysis for Low-Dose CT Image Denoising", PLOS One, vol. 10, No. 5, May 1, 2015, p. e0126914, XP055894130, DOI: 10.1371/journal.pone.0126914.

* cited by examiner

[Fig 1]
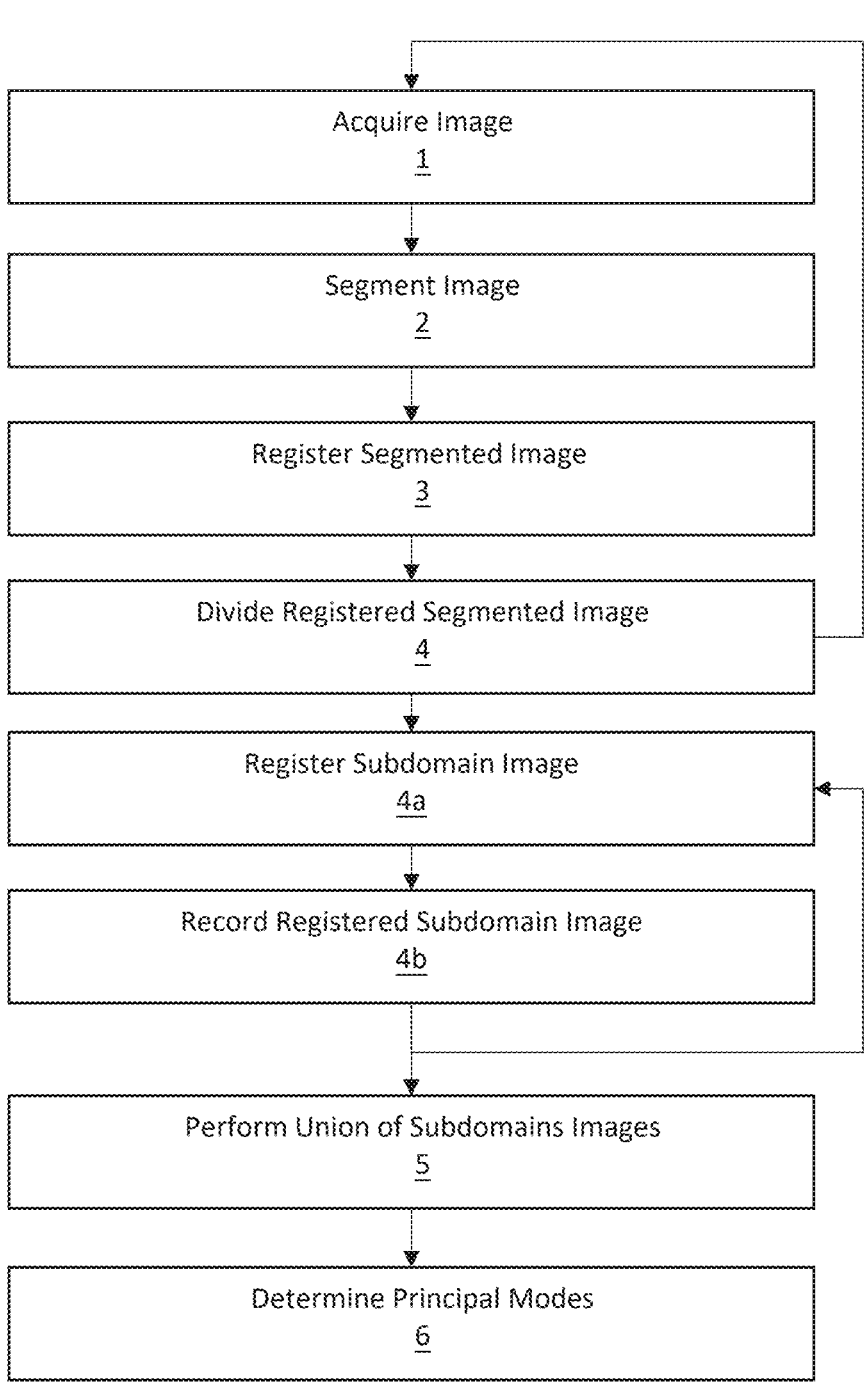

[Fig 2]
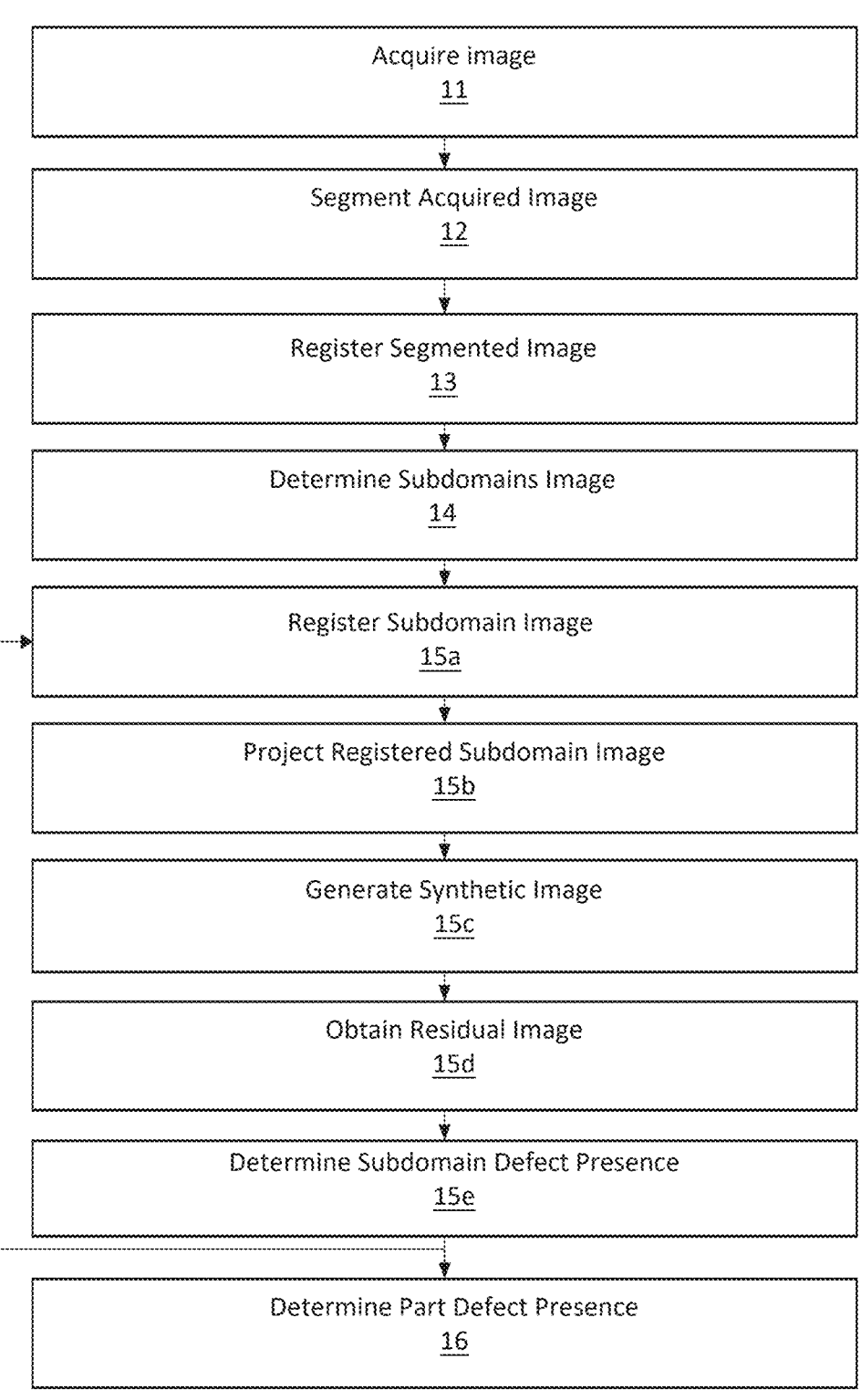

METHOD FOR DETERMINING THE PRESENCE OF ONE DEFECT ON A TOMOGRAPHIC IMAGE OF A THREE-DIMENSIONAL PART BY BREAKING THE IMAGE DOWN INTO PRINCIPAL COMPONENTS

TECHNICAL FIELD

The technical field of the invention is the analysis of three-dimensional images by machine learning, in particular such an analysis in the field of metallurgical defects.

The blades of high-pressure turbines are placed just after the combustion chamber, where they undergo high pressures, loads related to the high-speed rotation and temperatures above the melting temperature of the material.

To support these conditions, a set of elements are implemented. One of these elements is the installation of cavities that allow the circulation of air, extracted in the compressor of the engine, in the turbine blade to cool the latter. Another element is the optimisation of their mechanical strength. For this, they are manufactured with a single crystal orientation and with minimal metallurgical anomalies (porosity, shrinkage cavity, crack, etc.).

To inspect these metallurgical anomalies, X-ray inspection systems are central to the quality control since they allow a detection of internal defects. Only they are capable of excluding the presence of inclusions or of shrinkage cavities for example. Several thousand parts pass through these systems every year.

To optimize the thermomechanical strength of turbine blades, more and more complex circuits are being designed, making the radiographic inspection more and more complicated because of the superpositions of the patterns. One of the solutions, to both better separate the anomalies from the background and better characterize them, is imaging by tomography.

This method allows to reconstruct the blade in three dimensions in a tensor, the value of the points of which depends on the density and on the absorption factor of the material. The difficulty of such a method lies in the use of the measurements carried out and the location of possible anomalies in the mass of data. Indeed, for each X-ray image, an image of approximately 2000×2000 pixels is generated. In tomography, an image acquired with the same field of view parameters represents a volume of 2000×2000×2000 voxels. In other words, a tomographic image represents almost 2000 times more information to be analysed with respect to an X-ray image. It is therefore necessary to be able to help operators detect the defects.

The stakes are the inspectability of future blades, the automation of the inspection and the sharing of various quality controls (metrologic, wall thickness, material defect).

Today, more than 100,000 parts per year are inspected via radiography and NDT non-destructive testing represents practically half of the production costs of a crude blade of a high-pressure turbine.

There are local variations in gray levels linked to tomographic image reconstruction, and certain defects are open, that is to say that they are not enclosed in the material. Thus, even if it is possible to determine their surface well, there will be no borders between these defects and the background, making their detection more complex. Moreover, according to the size and the position of the defect, the latter is filtered in a particular manner (mutual transfer function). A defect of a certain size will not have the same level of gray as another defect of a different size or location. It is therefore difficult with the standard means to carry out automatic detection of indications.

PRIOR ART

The techniques of segmentation, that is to say the grouping together by regions of pixels according to at least one criterion, can be carried out in multiple ways: detection of simple geometric shapes, detection based on a library of indications, thresholding method, contour detection method, segmentation by watersheds, segmentation by region growing. These do not work for a use with tomographic images because of the local variations in the parts.

Detection by thresholding consists in defining a grayscale range for a particular component, for example a range for the air and a range for the superalloy. Thus, all the voxels having a value in a given range are defined as belonging to a given element. This method does not work because there are local variations in grayscale linked to tomographic image reconstruction. Thus, even if it is possible to determine their surface well, they are linked to the background. Moreover, according to the size and the position of the defect, the latter is filtered in a particular manner. Thus, a defect of a certain size will not have the same level of gray of a different size or location.

Another method involves detecting the edges of objects. For this, the analysis is carried out for example on the gradient of the image to differentiate two elements. This can allow to limit the impact of the local variations in the levels of gray. However, it remains impossible to sort the walls of metallurgical anomalies and the walls between the part and the air. First of all because the defects are open and are part of the wall, they are not easily separatable. Then, the value of this border is often buried in the rest of the information since the defect is of a small size, which makes it difficult to identify with respect to the rest of the information via the filtering function.

Detection by library consists in having available a set of images of defects and calculating the degree of resemblance of the latter to all of the image. Besides a significant calculation time related to the number of defects, this method is not compatible with the detection of metallurgical defects. First of all since a defect unknown to the library is not detected, which is not acceptable given the technological context and the level of risks associated with the manufacturing of turbine blades. Then the shape of the element of the real part is often close to an anomaly, which risks engendering a significant number of false positives.

The other techniques such as region growing are especially adapted to color images.

In order to overcome the limits of the conventional thresholding methods and make the segmentation automatic, it would be necessary to be able to flatten the image and separate the normal variations of the part and the abnormal variations.

To be able to do this, the simplest solution is to subtract a tensor representing the nominal part, or a golden part (that is to say a part representative of an average of parts produced) from the tensor of the part to be analyzed. The difficulty of carrying out this operation is that the internal and external variability of the part is significant, and that the latter can even be greater than the size of the anomalies sought. It is therefore necessary to apply other techniques. Variability means the fact that the parts have different thicknesses because of the production deviations. The distribution of these thicknesses constitutes the production variability. The internal variability applies only to the walls inside the part while the external variability relates only to the skin of the blade.

It is also possible to use a frequential analysis to determine the anomalies sought. One of the most common methods in signal processing is to carry out a Fourier transform of the image to be analyzed and filter the image in this new space then go back to spatial coordinates by an inverse Fourier transform in order to carry out the segmentation step.

The difficulty of this method is that the edges of the part are in theory step (Heaviside) functions composed of a broad frequency spectrum. Even if in reality the edges are not perfectly distinct, the spectrum of the walls and of the defects are not discriminable. Not only the spectrum cannot be differentiated in value, but the signature of the spectrum can be similar between a defect and a local geometric variation of the part.

Another method allowing to analyze the image and separate its various components is a decomposition of the image into series. This method consists in rewriting the image as a sum of elementary functions. This is for example possible with Haar scaling functions which involve decomposing the image into images with several resolutions. Another example is the use of wavelets in particular Mexican hat wavelets. The case of the Fourier frequency representation is also a particular case of decomposition of the signal.

The difficulty with these various functions is that they are not adapted to discriminate the signatures of a defect and those of the part. For example the signals of a defect and those of a wall are described over the entire field of the resolutions. In our case the signature of the part without a defect is first and foremost spatial, which these operators represent poorly.

There is therefore a need for a determination of the presence of defects in tomographic images of three-dimensional parts.

DISCLOSURE OF THE INVENTION

The object of the invention is a method for determining a reference base of three-dimensional parts coming from a production line without defects comprising the following steps:

For each part out of a predefined number of healthy parts, representative of the production, the following steps are carried out:

Step 1: an acquisition of an image of a part is carried out,

Step 2: the volume of the image acquired is segmented,

Step 3: the segmented image of the healthy part is registered with respect to an image in three dimensions of the three-dimensional part coming from computer-aided design, Step 4: the registered segmented image is divided into a set of at least two subdomains, for each of the subdomains, the following steps are carried out:

Step 4a: each subdomain is registered on the corresponding zone of the three-dimensional image obtained by CAD, Step 4b: and each registered subdomain is recorded, Step 5: the concatenation of the subdomain of all of the images of the parts having been subjected to a division into subdomains is carried out, Step 6: the principal modes are determined via a decomposition into principal components (PCA), and the principal modes obtained are recorded, for the subdomain, in the reference base.

A registering of the segmented image with respect to the images of the reference base can be carried out so as to eliminate possible offsets.

A registering of a subdomain with respect to the corresponding subdomain of the reference base can be carried out so as to eliminate the possible offsets. Registering each subdomain allows to obtain lower variability in each subdomain.

The acquisition of an image of a part is carried out by tomography, by temporal imaging, by radiography or by optical imaging.

The object of the invention is also a method for determining the presence of at least one defect in a three-dimensional part coming from a production line according to a reference base coming from a determination method as described above, wherein the following steps are carried out:

step 11: acquiring an image of the part, step 12: segmenting the acquired image, step 13: registering the segmented image with respect to a representation in three dimensions of the part coming from CAD, step 14: determining subdomains associated with the registered image in a similar manner to step 4 of the method for determining a reference base corresponding to the division into subdomains carried out on the images used to establish the reference base, step 15: for each subdomain, carrying out the following substeps:

step 15a: each subdomain is registered with respect to a reference subdomain obtained on the corresponding zone of the three-dimensional image obtained by computer-aided design, step 15b: the registered image (15a) of the subdomain is projected onto the modal base associated with this subdomain, the modal base comprising the principal modes of the reference base for the subdomain, step 15c: a synthetic image of the subdomain is generated from the projection (15b), step 15d: a residual image is obtained by subtracting the synthetic image of the subdomain studied (15c) and the initial image of the subdomain (15a), in order to eliminate the elements forming the healthy part of the part of the three-dimensional image, step 15e: it is determined that a defect is present in the subdomain, in particular by comparing the value of each voxel of the residual three-dimensional image of the subdomain to a predetermined threshold.

The decomposition of a subdomain not associated with any defect can be recorded in the reference base.

The acquisition of an image of a part can be carried out by tomography, by temporal imaging, by radiography or by optical imaging.

The three-dimensional part coming from computer-aided design represents a definition of the part as designed, also called ideal part since this is a modeling of a part without defects.

BRIEF DESCRIPTION OF THE DRAWINGS

FIG. 1 illustrates the main steps for determining a reference base, and

FIG. 2 illustrates the main steps of a method for determining the presence of defects in tomographic images of three-dimensional parts.

DETAILED DESCRIPTION

The method according to the invention is based on the decomposition of an image by tomography in a statistical modal base. In such an approach, the image is not described as a series of predetermined functions, but as functions having the greatest weighting. For this, it is necessary to carry out a training of the base on a set of healthy parts in order to capture/measure the repeatable spatial signatures of the healthy parts. This analysis allows to have a representation of the healthy part of the part. In order to limit the effects of the offsetting of the part, it is preferable to carry out a registering, local or global, of the part before the analysis. This allows to eliminate the signal caused by the position of the part despite the significant geometric variations in the parts produced.

In order to carry out the steps of decomposition into principal components, a reference base must be available. The latter is created from tomographic images of parts representative of the production free of defects. The parts representative of the production are defined as being the parts corresponding to the average of all the parts acquired by tomography of the production. These are parts comprising variations, contrary to a three-dimensional part coming from CAD.

FIG. 1 illustrates the steps for determining a reference base.

For each of the parts belonging to a set of n healthy parts, representative of the production, the following steps 1 to 4 are carried out. Healthy means a part from the production not having any defects.

During a first step 1, the acquisition of an image of a part by tomography is carried out. The tomographic image can be obtained after a step of reconstruction from a plurality of acquisitions.

A tomographic image is represented by a volume discretized into voxels (three-dimensional analogy of the pixels in an image, parallelepipedic or cubic structure), each element of which is associated with a value in grayscale. Each of these levels of gray represents a value related to the absorptivity of the X-radiation in the measurement volume.

During a second step 2, the volume of the image is segmented so as to reduce the quantity of data to be processed.

Let I be the scanned part. The volume $I_I$ of the image of the object can thus be represented in grayscale. The structure of voxels allows to decompose each $I_I$ such that:

$$I_l = (I_{ijk})_{i,j=definition\ of\ the\ image} \qquad \text{(Eq 1)}$$

With: $I_{ijk}$: the value in grayscale of the voxel node (i,j,k) of the image of I.

During a third step 3, the segmented image is registered with respect to an image in three dimensions of the same part coming from computer-aided design (CAD). The registered segmented image and the image in three dimensions coming from CAD are thus located in the same known reference frame.

During a fourth step 4, the registered segmented image is divided into a set of t subdomains allowing to divide the volume into a set of subspaces.

For each subdomain t, the following substeps 4a and 4b are then carried out.

During the substep 4a, each subdomain t is registered with respect to a reference subdomain r obtained on a registered image of a part representative of the production.

During a substep 4b, each registered subdomain t is recorded.

Once all of the t subdomains have been registered, the method continues with a fifth step 5 during which the concatenation of the subdomain of all of the images of the parts having been subjected to a division into subdomains is carried out. Each subdomain is grouped together into a tensor noted as $X_{sdx}$. The indices sdx representing the number of the subdomain. For purposes of mathematical manipulation, the tensors of the images are mapped linearly to a vector space having a dimension equal to the number of voxels. This operation can be comparable to a flattening of the tensor reducing all the dimensions to a single one.

For each subdomain sdx, a vector space $X_{sdx\_union}$ is described on the basis of the tensors $X_{sdx}$ of all of the n parts tomographed.

$$X_{sdx\_union} = \bigcup_{nparts} X_{sdx} \qquad \text{(Eq 2)}$$

During a sixth step 6, for each of the t subdomains, "the principal modes" of each tensor rewritten as $X_{sdx\_union}$ are calculated, allowing to represent them. In other words, $X_{sdx\_union}$ is decomposed such that:

$$X_{sdx\_union} = U\Sigma V^* \qquad \text{(Eq 3)}$$

With:
$\Sigma$: the singular values of the subdomain corresponding to the roots of the eigenvalues of $$X_{sdx\_union}^{T^*} X_{sdx\_union},$$

U: a set of input vectors of an orthonormal base,
V: a set of output vectors of an orthonormal base.

This rewriting of the tensor $X_{sdx\_union}$ allows to give the optimal solution of the diagonalization of $X_{sdx\_union}$. The pseudo-diagonal tensor 2 extracted is composed of eigenvalues and the tensor U contains the associated eigenvectors which we call modes. The principal modes are a selection of the first modes in order to not consider them all. The principal modes thus allow to reduce the quantity of information of each tensor $X_{sdx\_union}$ and to only keep the necessary information in each of the t subdomains while having a good representation of each of the t subdomains.

To obtain this, it is necessary to apply a statistical data processing algorithm: PCA, UMAP, t-SNE, Laplacian Eigen Maps in order to extract the frequency modes of each column of a tensor.

It is recalled that a method of the PCA type proposes an orthogonal decomposition of the tensor of interest with highlighting of the modes of covariance from the greatest to the smallest. This property allows an interpretation then an algorithmic weighting of the modes obtained. Such an approach thus lends itself to a use via statistical learning sometimes called machine learning.

It results from the convergence of the method with high-frequency data according to the works of Aït-Sahalia and Xiu (Principal Component Analysis of High-Frequency Data, Y. Aït-Sahalia., D. Xiu, Journal of the American Statistical Association, Vol. 114, no 525, 287-303, 2019), where the reconstruction of structure remains ensured with a small number of modes. Methods for dynamic decomposition were implemented in the works of Schmid (Decomposition of time-resolved tomographic PIV, P. J. Schmid, D. Violato, F. Scarano, Exp Fluids, Vol. 52, 1567-1579, 2012), where the transitional structures of fluid regimes are studied by tomography or PIV techniques. This study shows that the calculation kernel also adapts for a calculation in real time with a reduced number of modes.

The use of frequency modes by PCA decomposition has also been used for coherence tomographic imaging (Dual-Baseline Coherence Tomography, R. Shane, IEEE Geoscience and remote sensing letters, Vol. 4, no 1, 127-131, 2007), in order to better correct the numerical stability of a new reconstruction formulation. Finally, the coupling with learning has already been observed, like the works of Dervilis et al. (On damage diagnosis for a wind turbine blade using pattern recognition, N. Dervilis, M. Choi, S. G. Taylor, R. J. Barhorpe, G. Park, C. R Farrar, K. Worden, Journal of Sound and Vibration, vol. 333, 1833-1850, 2014), where such techniques were developed in order to monitor and predict the initiation of macroscopic damage on wind turbine blades. The latter, manufactured with carbon-fiber composites, make the instrumentation difficult without pre-damaging the sample. Non-linear PCA techniques have also been used, as well as a stochastic PCA model.

After the sixth step 6, the principal modes for each subdomain of the tomographic image of a healthy part of the reference base are thus available.

It is thus possible to inspect for the presence of defects in tomographic images of parts to be inspected according to the principal modes of the subdomains of the reference base.

To do this, the subdomains associated with a tomographic image of a part to be inspected are calculated in a manner similar to the division into subdomains carried out on the tomograms used to establish the reference base. Each subdomain of the tomographic image of the part to be inspected is then decomposed with respect to the principal modes of each corresponding subdomain of the reference base. A synthetic image is then generated from the principal modes of each subdomain of the part to be inspected. This synthetic image allows to represent the tomographic image of the part to be inspected without defects. A subtraction (or another similar operation like division) is then carried out between this synthetic image and the real image acquired in order to eliminate the elements forming the healthy part of the part of the real image (image acquired by tomography during step 1). The residual image obtained thus comprises only a defect possibly present in the part to be inspected. Indeed, only the healthy parts of a part are comprised in the principal modes derived from the principal modes of the reference base. The defects and anomalies are not found in the principal modes of the reference base.

By eliminating the low-frequency components and the parts of the image corresponding to the healthy metal, the signature of the defects is greatly highlighted.

A method for determining the presence of at least one defect in a tomographic image according to the invention comprises the following steps.

During a first step 11, the acquisition of a tomographic image of a part to be inspected is carried out.

During a second step 12, a segmentation of the image of the part is carried out by applying the equation [Eq 1].

During a third step 13, a registering of the segmented image with respect to the three-dimensional images of the computer-aided design is carried out so as to dispose all the parts at the same coordinates.

During a fourth step 14, a division of the registered segmented image into subdomains similar to the subdomains of the reference base is carried out.

For each subdomain, a step 15 comprising the following substeps 15a to 15e is carried out.

During a substep 15a, a registering of the subdomain with respect to the corresponding subdomain of the reference base is carried out so that they are disposed at the same coordinates.

During a substep 15b, the registered image of the subdomain is projected onto the modal base associated with this subdomain via the following equation:

$$a_i = <X_{sdx}, U_i> \qquad (Eq\ 4)$$

With:
$<.,.>$: the operator of the scalar product
$X_{sdx}$: the tensor which represents the registered image
$U_i$: the i-th eigenvector of the base
$a_i$: the contribution of the mode specific to the image.

During a substep 15c, these principal modes are projected so as to obtain a synthetic image of the subdomain and a synthetic image of the subdomain is recomposed.

$$X_{synthetic} = \sum_{specific\ modes} a_i U_i + mean(X_{sdx}) \qquad (Eq\ 5)$$

During a substep 15d, a residual image of the subdomain is determined by subtracting (without however being limited to this operation) the synthetic image of the subdomain from the registered image of the subdomain.

During a substep 15e, the indications are detected. For this, it is for example possible to compare the value of each pixel of the residual image of the subdomain to a predetermined threshold. It is determined whether at least one pixel of the subdomain has a value greater than the predetermined threshold. If this is the case, it is determined that the part has a defect in this subdomain. If this is not the case, it is determined that the part does not have a defect in this subdomain. The method repeats steps 14 to 15 for each of the subdomains. Other methods like Canny filters, or segmentation by region growing for example are also possible.

The determination method ends during a sixth step 16, when it has been determined that a subdomain comprises a defect or that none of the subdomains comprises a defect.

The determination method described above can be applied to three-dimensional images obtained by methods other than tomography. Mention can be made in particular of temporal imaging for which an immobile part is the object of periodic acquisitions over a predefined period of time. The images obtained by each periodic acquisition are stacked in order to form a cube of data similar to the tomographic image. Each voxel of the cube of data is thus associated with the intensity of absorption, emission or transmission of the radiation used. Such an imaging technique can be applied to the infrared range as well as to other frequency ranges of the electromagnetic spectrum.

In another embodiment, the determination method is applied to the processing of raster images coming from an optical or radiographic acquisition of parts representative of the production.

The steps of the determination method are then similar to those of the determination method based on tomographic images. It differs therefrom by the taking into account of two-dimensional images for each pixel of which a grayscale or color intensity is associated.

More precisely, grayscale images are systematically considered for the images coming from a radiographic acquisition. Each pixel is associated with a grayscale intensity.

Color or grayscale images are considered for the images coming from an optical acquisition. In the case of a color image, an intensity for a color component of the image, for example for each red, green and blue component, is assigned to each pixel. Other colorimetric systems for decomposition of the color can be used like the luminance-chrominance YUV system. The determination method is then applied to each color component matrix.

In a specific embodiment, it is possible to convert a color image into a grayscale image in order to reduce the memory and the processing time necessary. Such a conversion is known from the prior art.

Step 2 is adapted to take into account the nature of the image obtained (two dimensions). The volume of the image is segmented so as to reduce the quantity of data to be processed.

Let I be the scanned part. The volume $I_I$ of the image of the object can thus be represented in grayscale. The structure of voxels allows to decompose each $I_I$ such that:

$$I_I = (I_{ij})_{i,j=definition\ of\ the\ image} \quad (Eq\ 6)$$

With: $I_{ij}$: the intensity value of the pixel (i, j,) of the image of I.

The other steps (steps 3 and following) of the determination method are similar to those of the determination method on images coming from tomography.

The invention claimed is:

1. Method for determining the presence of at least one defect in a three-dimensional part coming from a production line according to a reference base, comprising the following steps:
   a) assembling a set of defect-free parts comprising a predefined number of parts, considered to be without defects and considered to be representative of the parts out of the production line,
   b) for each defect-free part of the set, the following steps are carried out:
      i. acquiring an image of the defect-free part,
      ii. segmenting the image of the defect-free part,
      iii. registering the segmented image of the defect-free part with respect to an image in three dimensions of the part coming from computer-aided design,
      iv. dividing the registered segmented image of the defect-free part into at least two subdomain images, and
      v. for each of the subdomain images,
         (1). registering the subdomain image on the three-dimensional image obtained by computer aided design, and (2). recording the registered subdomain images in a tensor,
   c) for each subdomain,
      i. carrying out the union of the tensors of the registered subdomain images across the defect-free parts of the set in a rewritten tensor, then
      ii. determining principal modes of the rewritten tensor via a decomposition into principal components, and
      iii. recording the principal modes obtained, for the subdomain, in the reference base,
   d) providing a part to test for defects from the production line, different from the set of defect-free parts,
   e) acquiring an image of the tested part,
   f) segmenting the acquired image of the tested part,
   g) registering the segmented image of the tested part with respect to a representation in three dimensions of the part coming from computer aided design,
   h) dividing the registered segmented image of the tested part into at least two subdomain images, the subdomains associated with the registered image being determined similarly to the determination of subdomains involved in determining the reference base, and
   i) for each subdomain image of the tested part, the following substeps are carried out:
      i. registering the subdomain image of the tested part on the three-dimensional image obtained by computer-aided design,
      ii. projecting the registered image of the subdomain of the tested part onto a modal base associated with this subdomain, the modal base comprising the principal modes of the reference base for the subdomain,
      iii. generating a synthetic image of the subdomain from the projection,
      iv. obtaining a residual image by subtracting the synthetic image of the subdomain and the subdomain image, in order to eliminate the defect-free elements off the three-dimensional image, and
      v. determining that a defect is present in the subdomain of the tested part in particular by comparing the value of each voxel of the residual image of the subdomain of the tested part to a predetermined threshold.

2. Determination method according to claim 1, wherein each segmented image of each defect-free part is registered to eliminate possible offsets.

3. Determination method according to claim 1, wherein each subdomain image of each defect-free part is registered with respect to the corresponding subdomain image of the reference base to eliminate the possible offsets.

4. Determination method according to claim 1, wherein the image of each defect-free part is acquired by tomography, by temporal imaging, by radiography or by optical imaging.

5. Determination method according to claim 1, wherein the image of the tested part is acquired by tomography, by temporal imaging, by radiography or by optical imaging.

* * * * *